US007911517B1

(12) United States Patent
Hunt, Jr. et al.

(10) Patent No.: US 7,911,517 B1
(45) Date of Patent: Mar. 22, 2011

(54) DEVICE AND METHOD FOR ACQUIRING DIGITAL COLOR-INFRARED PHOTOGRAPHS FOR MONITORING VEGETATION

(75) Inventors: Earle Raymond Hunt, Jr., Silver Springs, MD (US); David Stone Linden, Dexter, MI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 462 days.

(21) Appl. No.: 11/980,868

(22) Filed: Oct. 31, 2007

(51) Int. Cl.
*H04N 3/14* (2006.01)
(52) U.S. Cl. ...................................... 348/272
(58) Field of Classification Search .................... 348/272
See application file for complete search history.

(56) References Cited

U.S. PATENT DOCUMENTS

| 3,971,065 A | 7/1976 | Bayer |
| 6,292,212 B1 | 9/2001 | Zigaldo et al. |
| 6,366,681 B1 * | 4/2002 | Hutchins ...................... 382/110 |

OTHER PUBLICATIONS

Gates, D., et al., "Spectral Properties of Plants," *Applied Optics*, vol. 4, (1), 1965, pp. 11-20.
Gitelson, A., et al., "Use of a Green Channel in Remote Sensing of Global Vegetation from EOS-MODIS," *Remote Sensing of Environment*, vol. 58, 1996, pp. 289-298.
Hunt, E., et al., "Evaluation of Digital Photography from Model Aircraft for Remote Sensing of Crop Biomass and Nitrogen Status," *Precision Agriculture*, vol. 6, 2005, pp. 359-378.
Kniplin, E., "Physical and Physiological Basis for the Reflectance of Visible and Near-Infrared Radiation from Vegetation," *Remote Sensing of Environment*, vol. 1, 1970, pp. 155-159.
Hunt, E., et al., "Agricultural Remote Sensing using Radio-Controlled Model Aircraft," *Digital Imaging and Spectral Techniques: Applications to Precision Agriculture and Crop Physiology*, ASA Special Publication No. 66, ASA-CSSA-SSSA pp. 197-205, 2003.
Hunt, E., et al., "High-Resolution Multispectral Digital Photography using Unmanned Airborne Vehicles," *20th Biennial Workshop on Aerial Photography, Videography, and High Resolution Digital Imagery for Resource Assessment*, Oct. 4-6, 2005.
Rouse, J.W., et al., "Monitoring vegetation systems in the Great Plains with ERTS", S. C. Freden, E. P. Mercanti, M. Becker (eds.), *Third Earth Resources Technology Satellite-1 Symposium*, vol. I: Technical Presentations, NASA SP-351, National Aeronautics and Space Administration, Washington, DC (1974), pp. 309-317.
Colwell, R., "Determining the Prevalence of Certain Cereal Crop Diseases by Means of Aerial Photography," *Hilgardia*, vol. 26, (5), 1956, pp. 223-286.
Johnson, D., et al, "VegMeasure Version 1.6 User's Manual," *VegMeasure Source Code & VegMeasure Users Guide*, VegMeasure Project, Department of Rangeland Resources Oregon State University, 2003.

(Continued)

*Primary Examiner* — James M Hannett
(74) *Attorney, Agent, or Firm* — John D. Fado; G. Byron Stover

(57) ABSTRACT

A charge-coupled-device (CCD) camera system for detecting near-infrared (NIR) wavelengths, involving (a) a color CCD camera having a multitude of channels including red and near-infrared responsive channels, green responsive channels, and blue responsive channels, and (b) filter means which allow near-infrared light to pass and which block red light; wherein the CCD camera system does not include filter means which block near-infrared light.

10 Claims, 6 Drawing Sheets

OTHER PUBLICATIONS

Parr, A., "A National Measurement System for Radiometry, Photometry, and Pyrometry based upton Absolute Detectors," http://physics.nist.gov/Pubs/TN1421/contents.html, NIST Technical Note-1421, 2000.

* cited by examiner

DEVICE AND METHOD FOR ACQUIRING DIGITAL COLOR-INFRARED PHOTOGRAPHS FOR MONITORING VEGETATION

BACKGROUND OF THE INVENTION

The present invention relates to a charge-coupled-device (CCD) camera system for detecting near-infrared (NIR) wavelengths, involving (a) a color CCD camera having a multitude of channels including red and near-infrared responsive channels, green responsive channels, and blue responsive channels, and (b) filter means which allow near-infrared light to pass and which block red light; wherein the CCD camera system does not include filter means which block near-infrared light.

The reflectance spectrum of vegetation (FIG. 1) shows that vegetation has a strong absorption at visible wavelengths (400-700 nm) and has a strong reflection (and transmission) at near-infrared (NIR) wavelengths (700-1100 nm). The strong absorption in the visible is due to various leaf pigments, principally chlorophyll, and the strong reflection is due to leaf mesophyll cell structure (Gates, D. M., et al., Applied Optics, 4: 11-20 (1965); Knipling, E. B., Remote Sensing of Environment, 1: 155-159 (1970)). Chlorophyll is the key pigment harvesting light energy for photosynthesis and variations in chlorophyll are used to detect various stresses, such as plant nutrient deficiency. There is scientific debate as to which band in the visible is best, green (500-600 nm) or red (600-700 nm), for detection of chlorophyll concentration. However, the NIR band has been found to be critical for detection of vegetation biomass, leaf area index, cover, and health, so that all satellite sensors for remote sensing of natural resources have a primary band in the near-infrared.

Vegetation monitoring using color-infrared film photography was first established by Colewell (Colewell, R. N., Hilgardia, 26: 223-286 (1956)). Film that is sensitive to green, red and NIR is exposed and then developed so that the green film layer is displayed as blue, the red film layer is displayed as green, and the NIR film layer is displayed as red in order to be visually inspected by the human eye (FIG. 2A). Because of vegetation is highly reflective in the NIR and absorptive in the visible (FIG. 1), color-infrared photographs show vegetation as red, hence the term "false-color photographs."

Digital photography uses silicon-diode charge-coupled detectors in cameras where the silicon diodes have a spectral sensitivity from about 350 nm to about 1100 nm (Parr, A. C., NIST Technical Note 1421, National Institute of Standards and Technology, Gaithersburg, Md. (1996)). Most digital cameras use a Bayer pattern array of filters (U.S. Pat. No. 3,971,065) over an array of detector elements to obtain red, green and blue channels for a digital image pixel (FIG. 2B). All of the Bayer filters transmit at least some NIR light to either the blue, green or red channels, so almost all of the commercially-available digital cameras have an internal NIR-blocking filter. The internal NIR-blocking filter is removable thus allowing reflected NIR photons from vegetation to reach the detector elements.

Certain digital cameras (for example Kodak DCS cameras) have Bayer filters where the red, green and blue Bayer-pattern filters all transmit NIR light (FIG. 2C). When the internal NIR-blocking filter is removed, Zigadlo et al. (U.S. Pat. No. 6,292,212) found that placing a blue-blocking filter in front of the lens allowed the blue channel to record the NIR photons reflected from vegetation. With elaborate calibration, the contribution of NIR photons to the green and red channels are calculated and are subtracted from the signal. Therefore, after extensive post-processing, the raw digital camera image is converted into a red, green and NIR false-color image (FIG. 2C). Currently, the few color-infrared digital cameras that are commercially available are based on the patent of Zigadlo et al.

For many commercially-available digital cameras, only the red Bayer-pattern filters transmit significant amounts of NIR photons, so the method of Zigadlo et al. cannot be applied. In addition, post-processing of each raw image to obtain a false-color image presents a significant extra workload that becomes a burden when processing large numbers of images. Furthermore, the calibration of the digital camera will change with temperature and with time, so the corrections for the green and red bands will change.

The present invention allows color-infrared digital photographs to be obtained at lower cost and without post-processing, and where a NIR, green and blue digital image is obtained instead of a NIR, red and green image as in Zigadlo et al.

SUMMARY OF THE INVENTION

In accordance with the present invention there is provided a CCD camera system for detecting near-infrared (NIR) wavelengths, involving (a) a color CCD camera having a multitude of channels including red and near-infrared responsive channels, green responsive channels, and blue responsive channels, and (b) filter means which allow near-infrared light to pass and which block red light; wherein the CCD camera system does not include filter means which block near-infrared light.

Also in accordance with the present invention there is provided a method for monitoring vegetation, involving acquiring digital color-infrared photographs of said vegetation by using the above CCD camera system

BRIEF DESCRIPTION OF THE DRAWINGS

The patent or application file contains at least one drawing executed in color. Copies of this patent or patent application publication with color drawing(s) will be provided by the Office upon request and payment of the necessary fee.

(FIG. 2C). Therefore, the method described here (FIG. 2D) must be used.

DETAILED DESCRIPTION OF THE INVENTION

The present invention is used to modify the characteristics of a conventional CCD camera or video sensor that has primary red, green and blue color responses and provides signal outputs on the green and blue output lines which represents green and blue respectively, and a signal output on the red output line which represents received NIR light intensity which is approximately from 700-1100 nanometers in wavelength. Conventional color CCD cameras employ a multitude of primary color red, green and blue responsive detector elements which are selected to respectively respond to the intensity of red, green and blue color light that impinges thereon. The detector elements are also responsive to near-infrared light. Therefore, the terms red channels, green channels and blue channels herein are also respectively equivalent to the terms red and near-infrared responsive channels, green and near-infrared responsive channels, and blue and near-infrared responsive channels, which are also used in this document. For many commercially-available digital cameras, only the red channel detects significant amounts of NIR light. The invention involves a filter that blocks red light. Such filters may be made in a number of ways known in the art. The red-blocking filter blocks red light and transmits NIR starting at about 700 nm (e.g., 700 nm) wavelength (preferably starting at about 725 nm (e.g., 725 nm) to avoid the edge of the chlorophyll absorption feature). Once the filters are constructed, they can be utilized to carry out the purpose of the invention which is to allow conventional primary color CCD cameras to be used for monitoring vegetation by converting such cameras to NIR sensors in an inexpensive but effective manner. No NIR-blocking filters are utilized, nor are color filters other than the red-blocking filter.

The red-blocking filter is constructed to allow NIR wavelengths to pass and to block red color wavelengths since the detector channels of CCD cameras respond to light within the wavelength range of approximately 400-1100 nm, including both visible light and NIR wavelengths. The red-blocking filter allows for the passage of NIR wavelength in the region of approximately 700-1100 nm (e.g., 700-1100 nm), preferably about 725-1100 nm (e.g., 725-1100 nm).

Figure 2:
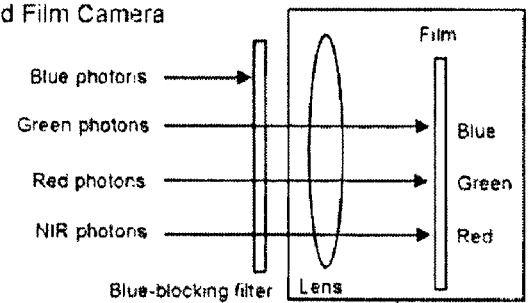
FIG. 2 shows schematic diagrams of (A) a color-infrared film camera, (B) a commercially-available digital camera, (C) the color-infrared digital camera based on the patent of Zigadlo et al., and (D) one embodiment of the present invention.
Figure 2:
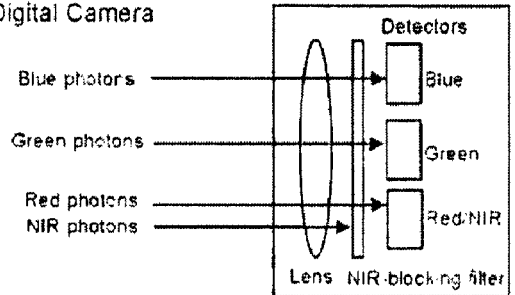
Figure 2:
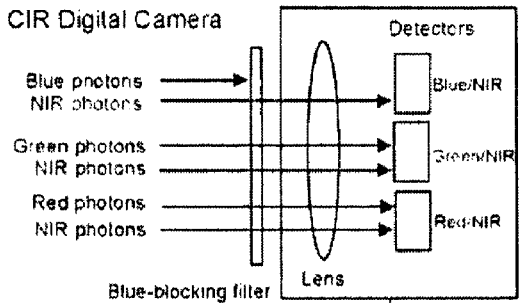
Figure 2:
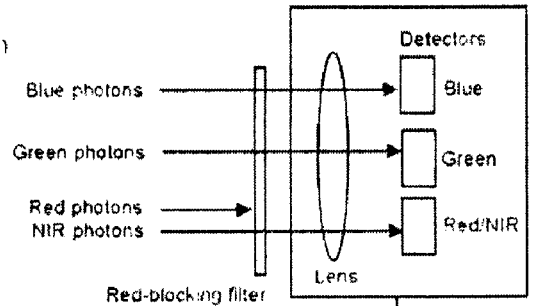

FIG. 2D shows a schematic diagram of one embodiment of the present invention which can utilize a conventional CCD camera to which has been added a red-blocking filter; no NIR filter is utilized. One of the principal advantages of the NIR-green-blue digital camera system presented in FIG. 2D is that post-processing is not required for the digital images, so the images can be visually inspected straight from the camera without additional electronic signal processors or external computer processing. Another principal advantage is the relatively low cost of the system; because the silicon diode charge-coupled detectors in conventional digital cameras are already sensitive to NIR light, it is easy to remove the internal NIR-blocking filter (if present in the conventional digital camera) and add a red-blocking filter in front of the lens of the camera.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

A FinePix S3 Pro UVIR camera (12 Megapixels; Fuji Photofilm Co., Ltd, Tokyo, Japan), which has no internal NIR-blocking filter, was utilized. The FinePix S3 Pro UVIR camera was spectrally calibrated by taking photographs of monochromatic light from an Jobin-Yvon (Edison, N.J.) SPEX 1680 monochrometer projected onto a Spectralon white panel (Labsphere, Inc., North Sutton, N.H.). The monochromatic light was from 400 to 800 nm wavelength with intervals of 10 nm. The average digital number for the red/NIR, green and blue channels was determined for the brightest part of the projected light by the Environment for Visualizing Images (ENVI version 4.3, Research Systems, Inc., Boulder. CO).

We tested the camera with an off-the-shelf cyan dichroic filter (Edmund Optics, Barrington, N.J.) placed in front of the lens to block out red light; however, the initial results using this filter were not satisfactory. We then ordered a custom interference filter from Omega Optical, Inc. (Brattleboro, VE) that blocked red light and transmitted NIR starting at 725 nm wavelength to avoid the edge of the chlorophyll absorption feature from 700 to 720 nm (called the red edge). The transmission spectra of the two filters were obtained using an ASD Fieldspec Pro FR spectrometer (Analytical Spectral Devices, Inc., Boulder, Colo.). The FinePix S3 Pro UVIR camera with the custom filter produced satisfactory NIR, green and blue digital images.

The camera was mounted in a Vector-P unmanned airborne vehicle (AeroView International, LLC, Bowie, Md.) controlled by computer to take photographs at user selected waypoints. The UAV was flown over a winter-wheat field at 39.03 degrees north latitude and 76.18 degrees west longitude. Tarpaulins of various colors were used to test the spectral and radiometric calibration of the camera (Hunt, E. R., Jr., et al., Comparison of Remote Sensing Imagery for Nitrogen Management, In: Robert, P. C. (Ed.), Proceedings of the Sixth International Conference on Precision Agriculture (CD-ROM), ASA-CSSA-SSSA, Madison, Wis. (2002); Hunt, E. R., Jr., et al., Agricultural remote sensing using radio-controlled model aircraft, p 191-199, In: VanToai, T. (Ed.), Digital Imaging and Spectral Techniques: Applications to Precision Agriculture and Crop Physiology, ASA Special Publication 66, ASA-CSSA-SSSA, Madison, Wis. (2003); Hunt, E. R., Jr., et al., Precision Agriculture, 6:359-378 (2005); Hunt, E. R., Jr., et al., High-resolution multispectral digital photography using unmanned airborne vehicles, In: Yang, C., and Everitt, J. L. (Eds), Proceedings of the 20th Biennial Workshop on Aerial Photography, Videography, and High Resolution Digital Imagery for Resource Assessment (CD-ROM), American Society of Photogrammetry and Remote Sensing, Bethesda, Md. (2006)).

The digital camera images were saved in Tagged Image File Format (TIFF) and imported into ENVI for processing. Green Normalized Difference Vegetation Index (GNDVI; Gitelson, A. A., et al., Remote Sensing of Environment, 58: 289-298 (1996)) is calculated:

$$GNDVI = (NIR - green)/(NIR + green)$$

where NIR is the digital number of the Red/NIR channel with the red-blocking filter and green is the digital number of the Green channel (FIG. 2D). The GNDVI was then divided into eight contiguous ranges (color density slices) where each range was assigned a color from purple (GNDVI<0.01) to magenta (GNDVI>0.5) with intervals in between of 0.07. Cool colors represented lower GNDVI than warm colors.

Figure 3:
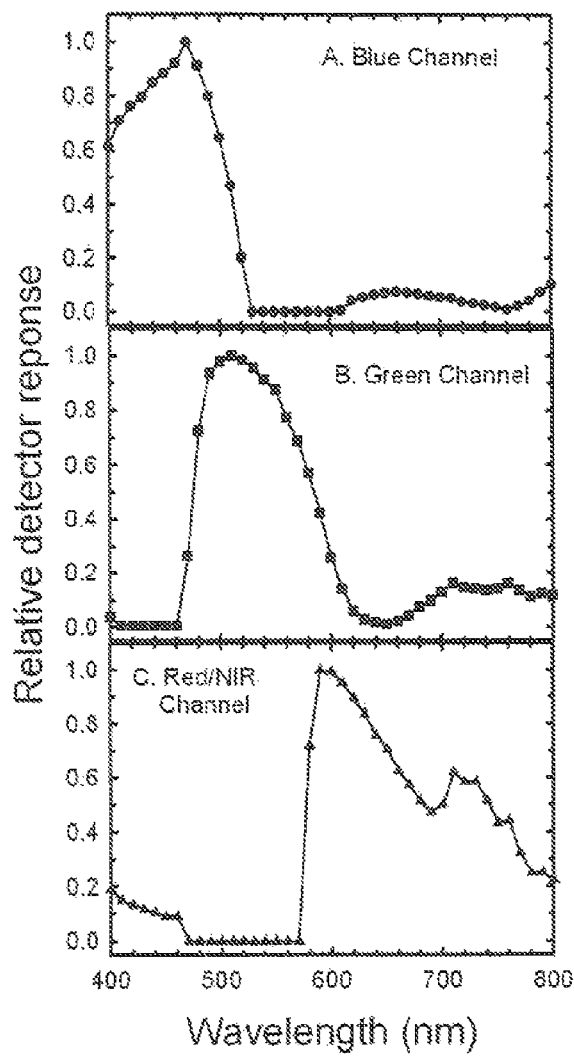
FIG. 3 shows relative spectral calibration of the Fuji FinePix S3 Pro UVIR camera for the (A) blue channel, (B) green channel, and (C) red/NIR channel. The lack of a NIR response for the blue and green channels showed that this camera cannot be used with the method of Zigadlo et al.

Results and Discussion: The spectral sensitivity of the camera showed that that the Red/NIR channels on the Fuji FinePix S3 Pro UVIR camera had significant response in the NIR (FIG. 3). The Blue and Green channels had a very small response in the NIR, so that pictures of vegetation appeared to be more pink than red. Above a wavelength of 800 nm, the responses of the three channels were about equal and at the noise level, so the principal response for the NIR came from the 700 nm-800 nm wavelength interval which is similar to other digital cameras (Hunt et al., 2005). The method of Zigadlo et al. can not be applied to cameras such as the Fuji FinePix S3 Pro UVIR camera in order to acquire NIR-red-green digital images.

Figure 4:
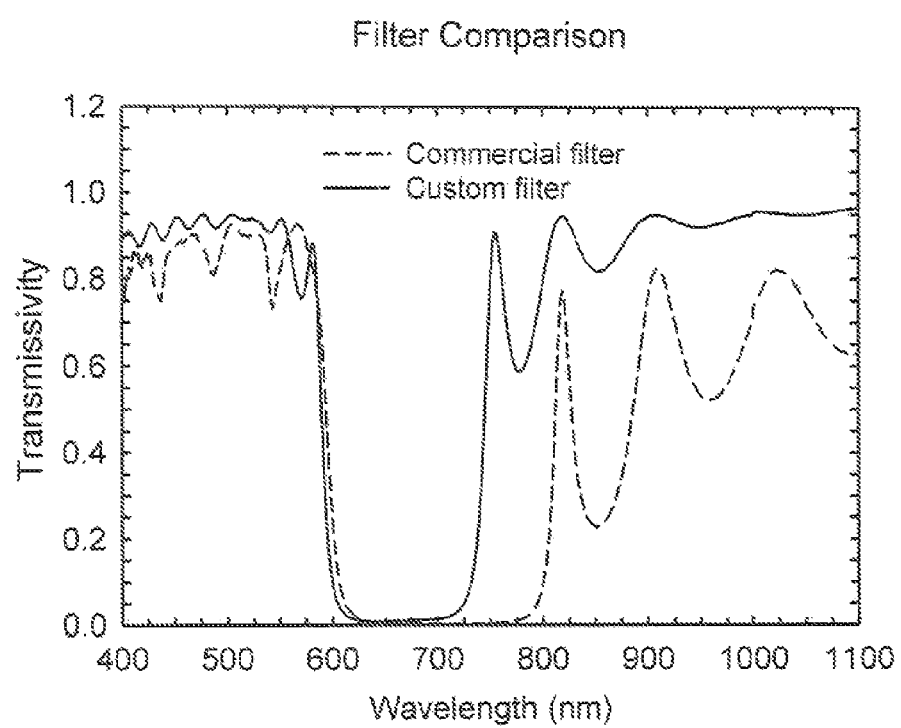
FIG. 4 shows the comparison of transmissivity at various wavelengths of a custom filter and a commercial filter, both described below, for producing near-infrared, green and blue digital imagery. The commercial filter was a dichroic cyan filter which blocked both red light (600-700 nm wavelength) and NIR light from 700-800 nm wavelength. The custom filter was designed to block red light and transmit more NIR light, and was made using known principles of optical interference filter design.

The custom red-blocking filter had high transmissivity in the 725 nm-800 nm wavelength interval compared to an off-the-shelf cyan filter (FIG. 4). The custom interference filter was built using standard materials so it may be easily replicated by other manufacturers and those skilled in the art.

Figure 1:
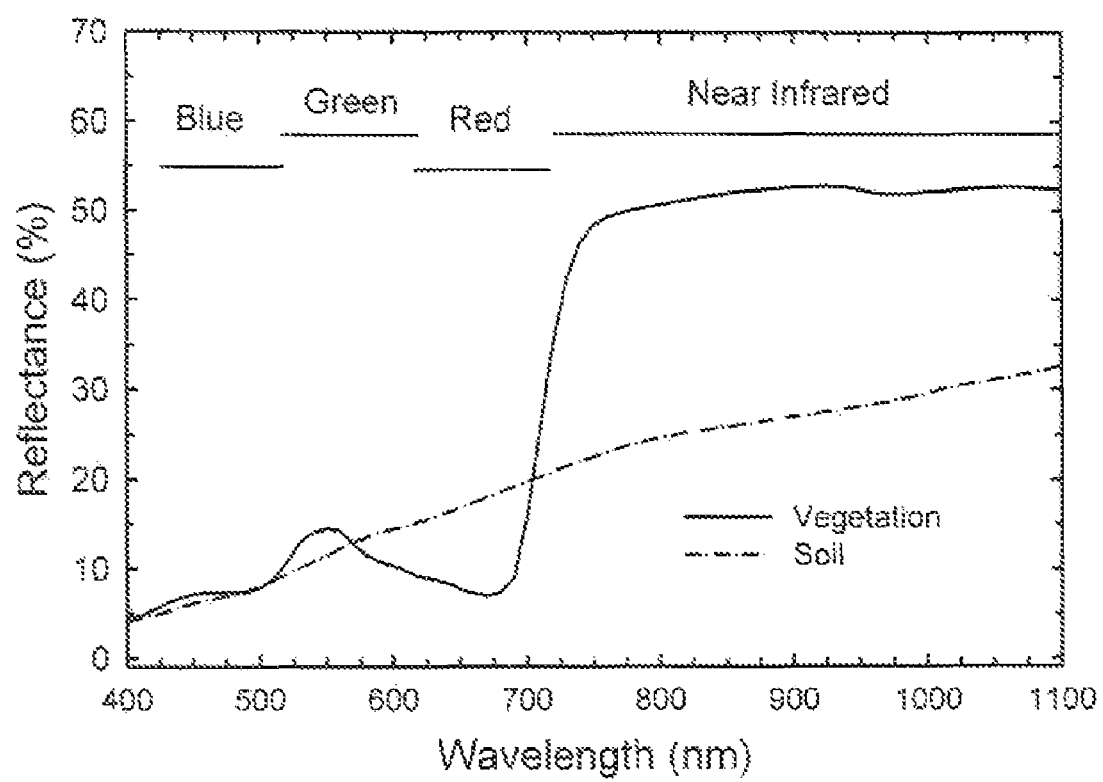
FIG. 1 shows the typical reflectance spectrum of vegetation and soil and the approximate wavelength bands of visible and near infrared (NIR) radiation.
Figure 5:
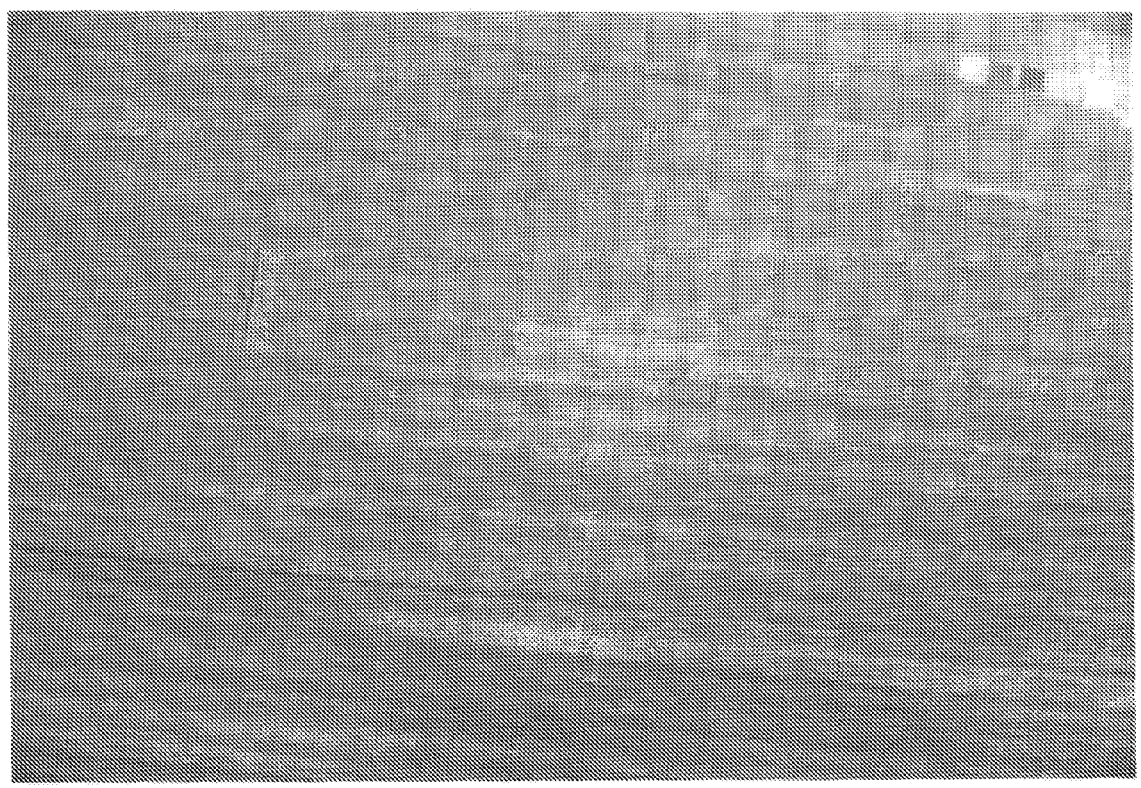
FIG. 5 shows a near-infrared, green and blue band digital image obtained from the invention mounted in a small UAV (unmanned aerial vehicle; AeroView International, LLC) flown over a crop of winter wheat in Maryland.

FIG. 5 shows a near-infrared, green and blue band digital image obtained from the invention mounted in a small UAV (AeroView International, LLC) flown over a crop of winter wheat in Maryland. The areas of red indicated areas of high amounts of winter wheat, whereas areas of cyan along the rows and along the top indicated areas of low vegetation. The pixel size of this image was less than 1 inch (about 2 cm). The two lines running from top to bottom in the center of the image were footpaths where the wheat was trampled slightly on the way to a sample plot. The squares along the top were tarps used to calibrate the digital images. The variation in crop growth in this image was caused by some soil factor (center) and inefficiency of the seed planter. The UAV had a global positioning system and inertial guidance unit to get the location of the image in the field for incorporation into a geographic information system. The NIR, green and blue digital images in FIG. 5 are very similar to the NIR, red and green images acquired using color-infrared film (FIG. 2A) because reflectance of red, green and blue light from vegetation is dominated by the absorption in leaves by chlorophyll (FIG. 1). NIR, green and blue digital images can also be acquired using cameras on the ground for the determination of plant cover using image processing programs such as ENVI or VegMeasure (Johnson, D. E., et al., VegMeasure Version 1.6 User's Manual, Department of Rangeland Resources, Oregon State University, Corvallis, Oreg. (2003)).

The digital numbers on an image are also affected by the solar spectral irradiance and the exposure settings of the camera. Therefore, the same pixel may have different digital numbers in different images, especially if the camera's exposure settings are automatically determined. Vegetation indices are a method for reducing the effects of irradiance and exposure, and enhancing the contrast between vegetation and the ground (Rouse, J. W., et al., Monitoring vegetation systems in the Great Plains with ERTS, pages 309-317, In: S. C. Freden, E. P. Mercanti, M. Becker (eds.), Third Earth Resources Technology Satellite-1 Symposium, Volume I: Technical Presentations, NASA SP-351, National Aeronautics and Space Administration, Washington, D.C. (1974); Gitelson et al., 1996).

Figure 6:
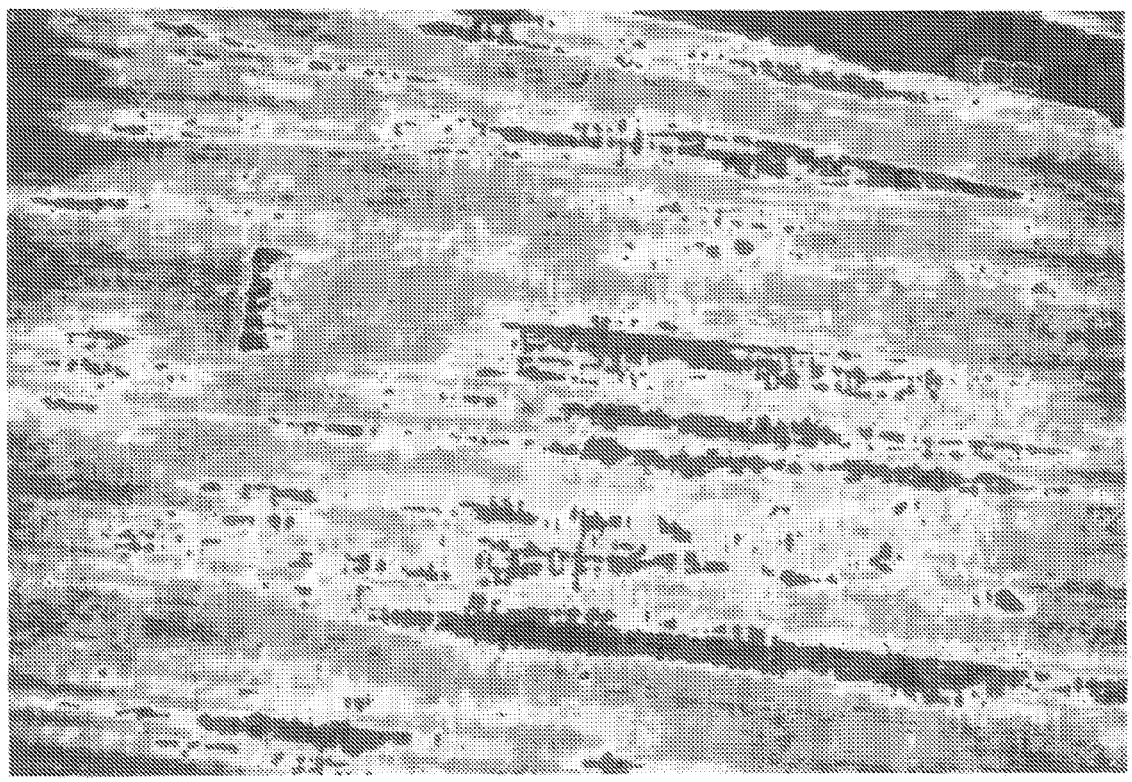
FIG. 6 shows a color-density slice of Green Normalized Difference Vegetation Index (GNDVI) over the same winter wheat field as in FIG. 5.

FIG. 6 shows a color-density slice of Green Normalized Difference Vegetation Index (GNDVI); it showed strong differences in the amount of vegetation over a winter wheat field. GNDVI enhanced the amount of vegetation to detect subtle changes of plant growth and health. The amount of vegetation was shown by the warmth of the colors (purple=no vegetation, red and magenta=high vegetation). From experiments and computer simulation modeling, the relationship between GNDVI and biomass was determined, which was then used to obtain agronomic information for the decision maker. GNDVI can be used in place of the common NDVI of Rouse et al. (1974). Furthermore, Gitelson et al. (1996) showed that GNDVI is better than the common NDVI for determining the nitrogen status of crops, so UAVs with the camera system of the present invention will be useful for management in site-specific agriculture or precision farming. Because blue, green and red wavelengths are all determined by the chlorophyll concentration in vegetation, the digital numbers on images from commercial digital cameras (FIG. 2B) will go up and down in accordance to the spectral absorption coefficient of chlorophyll (Hunt et al., 2005), so detection of crop nitrogen status requires systems with a NIR channel.

The invention shown in FIG. 2D was developed for crop nitrogen management; however the NIR-green-blue images can be used for other vegetation monitoring. One of the principal advantages of the NIR-green-blue digital camera system presented in FIG. 2D was that post-processing was not required for the digital images, so the images were visually inspected straight from the camera for the amount and type of vegetation. Another principal advantage was the relatively low cost of the system; because the silicon diode charge-coupled detectors in digital cameras were already sensitive to NIR light, and the present invention required the removal of the internal NIR-blocking filter (if present) and the addition of a red-blocking filter. Cameras such as the Fuji FinePix S3 Pro UVIR camera are sold without the internal NIR-blocking filter, so some cameras available for purchase do not have to be modified by removal of an internal NIR-blocking filter.

All of the references cited herein, including U.S. Patents, are incorporated by reference in their entirety. Also incorporated by reference in their entirety are the following, references: U.S. Pat. No. 5,555,464.

Thus, in view of the above, the present invention concerns (in part) the following:

A CCD camera system for detecting near-infrared (NIR) wavelengths, comprising (or consisting essentially of or consisting of): (a) a color CCD camera comprising a multitude of channels [or pixels or detector elements] comprising red and near-infrared responsive channels, green responsive channels (excluding green and near-infrared responsive channels), and blue responsive channels (excluding blue and near-infrared responsive channels), and filter means which allow near-infrared light to pass and which block red light; wherein said CCD camera system does not include filter means which block near-infrared light.

The above CCD camera system, wherein said filter means allows near-infrared light to pass starting at about 700 nm.

The above CCD camera system, wherein said filter means allows near-infrared light to pass starting at about 725 nm.

The above CCD camera system, wherein NIR, green and blue digital images are produced.

The above CCD camera system, wherein said CCD camera system is attached to an unmanned aerial vehicle.

The above CCD camera system, wherein said CCD camera system is attached to a stand, platform, or moving vehicle (e.g., trucks, tractors, ATVs).

The above CCD camera system, wherein a NIR, green, and blue image are produced.

A digital electronic camera, comprising (or consisting essentially of or consisting of) (a) a solid state color image sensor having an array of image sensing elements, (b) an array of red, green and blue color filter elements arranged over said image sensing elements for producing a color image, said red, green and blue filter elements arranged to filter light impinging on said color image sensor, and (c) a red-blocking filter which allow near-infrared light to pass and which blocks red light; wherein said camera does not have a near-infrared blocking filter.

The above digital electronic camera, wherein said camera has a lens.

The above digital electronic camera, wherein said red-blocking filter transmits near-infrared light starting at about 700 nm.

The above digital electronic camera, wherein said red-blocking filter transmits near-infrared light starting at about 725 nm.

The above digital electronic camera, wherein said red-blocking filter is placed in front of said lens to prevent light from about 600 to about 725 nm (e.g., 600-725 nm) from impinging on the image sensing elements on said red filter elements.

The above digital electronic camera, wherein a NIR, green, and blue image are produced.

The above digital electronic camera, wherein said camera is mounted in an unmanned aerial vehicle.

The above digital electronic camera, wherein said camera is mounted on a stand, platform, or moving vehicle.

A method for monitoring vegetation, comprising (or consisting essentially of or consisting of) acquiring digital color-infrared photographs of said vegetation by using the above CCD camera system or the above digital electronic camera.

The above method, wherein said monitoring involves calculating the Green Normalized Difference Vegetation Index for said vegetation using said digital color-infrared photographs.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A CCD camera system, comprising:
   (a) a color CCD camera having three channels, one of said three channels being responsive only to red and near-infrared light, one of said three channels being responsive only to green light, and one of said three channels being responsive only to blue light channels, and (b) filter means which allow near-infrared light to pass and which block red light at 600 nm to 700 nm, wherein said filter means block red light from reaching said three channels.

2. The CCD camera system according to claim 1, wherein said filter means allows near-infrared light to pass starting at 700 nm.

3. The CCD camera system according to claim 1, wherein said filter means allows near-infrared light to pass starting at about 725 nm.

4. The CCD camera system according to claim 1, wherein NIR, green and blue digital images are produced.

5. The CCD camera system according to claim 1, wherein said CCD camera system is attached to an unmanned aerial vehicle.

6. The CCD camera system according to claim 1, wherein said CCD camera system is attached to a stand, platform, or moving vehicle.

7. A method for monitoring vegetation, comprising acquiring digital color-infrared photographs of said vegetation by using the CCD camera system of claim 1.

8. The method according to claim 7, wherein said monitoring involves calculating the Green Normalized Difference Vegetation Index for said vegetation using said digital color-infrared photographs.

9. The CCD camera system according to claim 1, wherein said CCD camera system consists essentially of a color CCD camera having three channels, one of said three channels being responsive only to red and near-infrared fight, one of Said three Channels being responsive only to green light, and one of said three channels being responsive only to blue light, and (b) filter means which allow near-infrared light to pass and which block red light at 600 nm to 700 nm, wherein said filter means block red light from reaching said three channels.

10. The CCD camera system according to claim 1, wherein said CCD camera system consists of (a) a color CCD camera having three channels; one of said three channels being responsive only to red and nee-infrared light, one of said three channels being responsive only to green light, and one of said three channels being responsive only to blue light, and (b) filter means which allow near-infrared light to pass and which block red light at 600 nm to 700 nm, wherein said filter means block red light from reaching said three channels.

* * * * *